US012701353B2

(12) United States Patent
Park et al.

(10) Patent No.: US 12,701,353 B2
(45) Date of Patent: Aug. 4, 2026

(54) SPEAKER MODULE STRUCTURE AND ELECTRONIC DEVICE INCLUDING THE SAME

(71) Applicant: Samsung Electronics Co., Ltd., Suwon-si (KR)

(72) Inventors: Youngbae Park, Suwon-si (KR); Myungcheol Lee, Suwon-si (KR); Kiwon Kim, Suwon-si (KR); Taeeon Kim, Suwon-si (KR); Changshik Yoon, Suwon-si (KR); Joonrae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 18/075,046

(22) Filed: Dec. 5, 2022

(65) Prior Publication Data

US 2023/0095381 A1 Mar. 30, 2023

Related U.S. Application Data

(63) Continuation of application No. PCT/KR2022/000547, filed on Jan. 12, 2022.

(30) Foreign Application Priority Data

Jan. 13, 2021 (KR) ........................ 10-2021-0004804

(51) Int. Cl.
*H04R 1/28* (2006.01)
*H04R 1/02* (2006.01)

(52) U.S. Cl.
CPC ............. *H04R 1/288* (2013.01); *H04R 1/025* (2013.01); *H04R 1/2811* (2013.01); *H04R 2499/13* (2013.01)

(58) Field of Classification Search
CPC ...... H04R 1/288; H04R 1/025; H04R 1/2811; H04R 2499/13; H04R 1/34;
(Continued)

(56) References Cited

U.S. PATENT DOCUMENTS 9,723,400 B2 * 8/2017 Herold .................. H04R 1/028
9,918,161 B1 3/2018 Chen et al.
(Continued)

FOREIGN PATENT DOCUMENTS

CN 105706460 A 6/2016
CN 106878883 A 6/2017
(Continued)

OTHER PUBLICATIONS

Machine translation of KR20170081136 (Year: 2017).*
(Continued)

*Primary Examiner* — Dedei K Hammond
*Assistant Examiner* — Jennifer B Olson
(74) *Attorney, Agent, or Firm* — Jefferson IP Law, LLP

(57) ABSTRACT

A speaker module structure according to various embodiments may include a first structure, a second structure configured to couple to the first structure, and a speaker coupled to at least one of the first structure or the second structure, wherein the second structure comprises at least one groove configured to form a resonance space by coupling between the first structure and the second structure, the resonance space is connected to the speaker and has an adsorption material injected therein, and when the first structure and the second structure are coupled, one end of the groove comprises an opening formed in a closed loop comprising a part of the first structure and a part of the second structure.

22 Claims, 14 Drawing Sheets

(58) Field of Classification Search
CPC ......... H04R 2499/11; H04R 1/28; G06F 1/16; G06F 1/1688; G06F 1/1656
USPC ......................... 181/151, 148, 149, 153, 199
See application file for complete search history.

(56) References Cited

U.S. PATENT DOCUMENTS

| | | | |
|---|---|---|---|
| 10,009,682 B2 | 6/2018 | Schoeffmann et al. | |
| 10,057,678 B2 | 8/2018 | Kwon et al. | |
| 10,299,033 B2 | 5/2019 | Yang et al. | |
| 10,349,165 B2 | 7/2019 | Cao | |
| 10,368,160 B2 | 7/2019 | Qin et al. | |
| 10,419,847 B2 * | 9/2019 | Choi | H04R 1/288 |
| 10,609,471 B2 | 3/2020 | Cao | |
| 10,694,284 B2 | 6/2020 | Wilk et al. | |
| 11,265,629 B2 * | 3/2022 | Slotte | H04R 1/288 |
| 11,622,190 B2 * | 4/2023 | Cho | H04R 1/288 181/151 |
| 2007/0195982 A1 | 8/2007 | Saiki et al. | |
| 2009/0154734 A1 | 6/2009 | Jeong et al. | |
| 2010/0135516 A1 | 6/2010 | Saiki et al. | |
| 2013/0101150 A1 | 4/2013 | Yun et al. | |
| 2013/0223667 A1 | 8/2013 | Kim et al. | |
| 2015/0072723 A1 | 3/2015 | Schoffmann et al. | |
| 2016/0323675 A1 | 11/2016 | Dai et al. | |
| 2016/0345090 A1 | 11/2016 | Wilk et al. | |
| 2017/0142513 A1 | 5/2017 | Han | |
| 2017/0195781 A1 | 7/2017 | Kang et al. | |
| 2017/0353785 A1 | 12/2017 | Choi et al. | |
| 2020/0204906 A1 | 6/2020 | Shi | |
| 2020/0213713 A1 | 7/2020 | Wang | |
| 2021/0037321 A1 | 2/2021 | Shuzhi | |
| 2021/0185449 A1 | 6/2021 | Kim et al. | |

FOREIGN PATENT DOCUMENTS

| | | | |
|---|---|---|---|
| CN | 111405432 | A | 7/2020 |
| CN | 111510818 | A | 8/2020 |
| CN | 211321459 | U | 8/2020 |
| EP | 0 530 575 | A1 | 3/1993 |
| EP | 3 991 449 | B1 | 5/2022 |
| JP | 2007-288712 | A | 11/2007 |
| JP | 2009-267581 | A | 11/2009 |
| JP | 2012-034120 | A | 2/2012 |
| JP | 2017-130724 | A | 7/2017 |
| KR | 10-2013-0099460 | A | 9/2013 |
| KR | 10-1411416 | B1 | 6/2014 |
| KR | 10-2016-0107205 | A | 9/2016 |
| KR | 10-2017-0081136 | A | 7/2017 |
| KR | 10-1756673 | B1 | 7/2017 |
| KR | 10-2093231 | B1 | 3/2020 |
| KR | 10-2214654 | B1 | 2/2021 |
| WO | 2006/035564 | A1 | 4/2006 |
| WO | 2008/152783 | A1 | 12/2008 |
| WO | 2016/103747 | A1 | 6/2016 |
| WO | 2019/161702 | A1 | 8/2019 |
| WO | 2020/109793 | A1 | 6/2020 |
| WO | WO-2021218581 | A1 * | 11/2021 |

OTHER PUBLICATIONS

Machine translation of WO2021218581 (Year: 2021).*
Extended European Search Report dated Jun. 14, 2024; European Appln. 22739663.7-1207 / 4194997 PCT/KR2022000547.
International Search Report with Written Opinion and English translation dated Apr. 27, 2022; International Appln. No. PCT/KR2022/000547.
Japanese Office Action with English translation dated Aug. 19, 2025; Japanese Appln. No. 2023-542608.
Russian Decision to Grant with English translation dated Oct. 22, 2025; Russian Appln. No. 2023109279.
Russian Office Action with English translation dated May 22, 2025; Russian Appln. No. 2023109279.
Korean Office Action with English translation dated Jul. 22, 2025; Korean Appln. No. 10-2021-0004804.
Indian Office Action dated Dec. 30, 2025; Indian Appln. No. 202317038235.
Japanese Office Action dated Feb. 17, 2026; Japanese Appln. No. 2023-542608.
European Communication pursuant to Article 94(3) EPC dated Mar. 16, 2025; European Appln. No. 22 739 663.7-1207.
Chinese Office Action with English translation dated May 14, 2026; Chinese Appln. No. 202280009967.9.
Korean Office Action with English translation dated May 15, 2026; Korean Appln. No. 10-2021-0004804.

* cited by examiner

SPEAKER MODULE STRUCTURE AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/000547, filed on Jan. 12, 2022, which is based on and claims the benefit of a Korean patent application number 10-2021-0004804, filed on Jan. 13, 2021, in the Korean Intellectual Property Office, the disclosure of which is incorporated by reference herein in its entirety.

TECHNICAL FIELD

The disclosure relates to a speaker module structure and an electronic device including the same.

BACKGROUND ART

In general, an electronic device includes a speaker device for providing a sound service to a user, and the speaker device is fixed in the inner space of the electronic device.

The speaker device requires a resonance space for sound to be output from a speaker unit with quality. Therefore, the speaker device may include a case for containing a speaker unit for securing the resonance space.

In line with the current trends towards slimness and compactness of electronic devices, speaker devices disposed inside electronic devices also need to be compact. Specifically, the case for containing the speaker unit for securing the resonance space has a limited size, and the resonance space for sound quality may also have a limited space.

The above information is presented as background information only to assist with an understanding of the disclosure. No determination has been made, and no assertion is made, as to whether any of the above might be applicable as prior art with regard to the disclosure.

DISCLOSURE

Technical Problem

When an adsorption material is injected into the resonance space of a speaker device in the height direction of the speaker device so as to adsorb air, insufficient height of the speaker device may make the passage of movement of the adsorption material narrow, thereby interfering with the movement of the adsorption material into the resonance space. As a result, it may take a longer time for the adsorption material to move from the injection entrance to the resonance space, which is at a distance therefrom, during a process, thereby increasing the production cost. In addition, the device structure may narrow the adsorption material movement path, thereby making injection of the adsorption material difficult.

The speaker module may have an increased size to secure the injection opening or movement path for injecting the adsorption material. Therefore, there is a need for a structure regarding a speaker module configured such that, while making the speaker module compact, and the injection opening or movement path for injecting adsorption material can be secured.

Aspects of the disclosure are to address at least the above-mentioned problems and/or disadvantages and to provide at least the advantages described below. Accordingly, an aspect of the disclosure is to provide a speaker module structure and an electronic device including the same, wherein a case for containing a speaker unit is formed by coupling structures that can be separated independently, and an adsorption material can be injected through an opening formed through a side surface of the case.

Additional aspects will be set forth in part in the description which follows and, in part, will be apparent from the description, or may be learned by practice of the presented embodiments.

Technical Solution

According to various embodiments of the disclosure, a speaker module structure may include a first structure, a second structure configured to couple to the first structure, and a speaker coupled to at least one of the first structure or the second structure, wherein the second structure includes at least one groove configured to form a resonance space by coupling between the first structure and the second structure, wherein the resonance space is connected to the speaker and has an adsorption material injected therein, and wherein while the first structure and the second structure are coupled, one end of the groove includes an opening formed in a closed loop including a part of the first structure and a part of the second structure.

According to various embodiments of the disclosure, an electronic device including a speaker assembly that may include a first carrier, a second carrier configured to couple to the first carrier, and a speaker coupled to at least one of the first carrier or the second carrier, wherein the second carrier includes at least one groove configured to form a resonance space by coupling between the first carrier and the second carrier, wherein the resonance space is connected to the speaker and has an adsorption material injected therein, and wherein while the first carrier and the second carrier are coupled, one end of the groove includes an opening formed in a closed loop including a part of the first carrier and a part of the second carrier.

Advantageous Effects

According to various embodiments disclosed herein, an adsorption material may be efficiently injected into a resonance space in a speaker device through an opening formed through a side surface of the speaker device by coupling separable structures.

According to various embodiments disclosed herein, an opening for injecting an adsorption material is formed through a side surface of a speaker device such that the speaker device can have a reduced height than in the case of injection in the height direction of the speaker device, thereby reducing loss of space.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
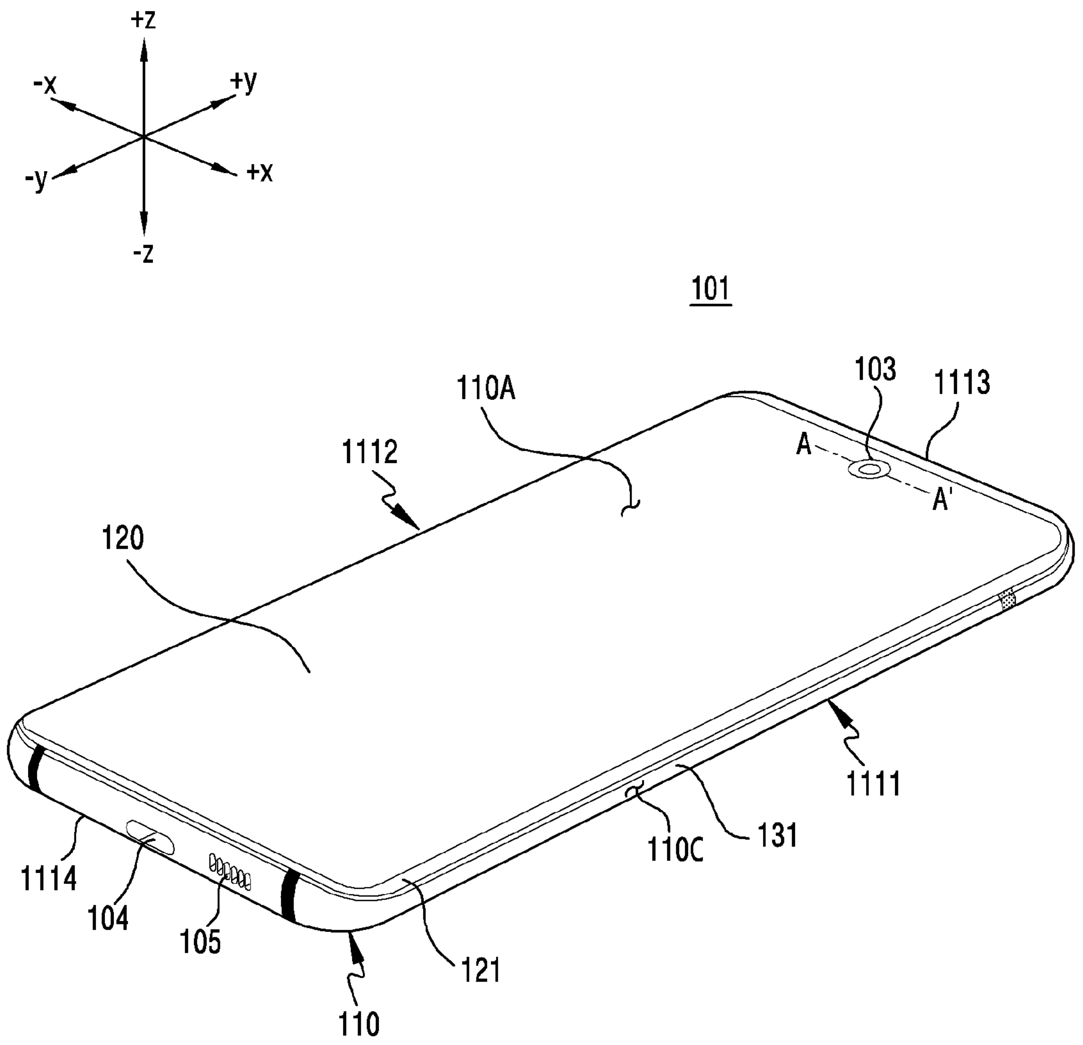
FIG. 1 is a front perspective view of an electronic device according to an embodiment.

FIG. 1 is a front perspective view of an electronic device 101 according to an embodiment.

Figure 2:
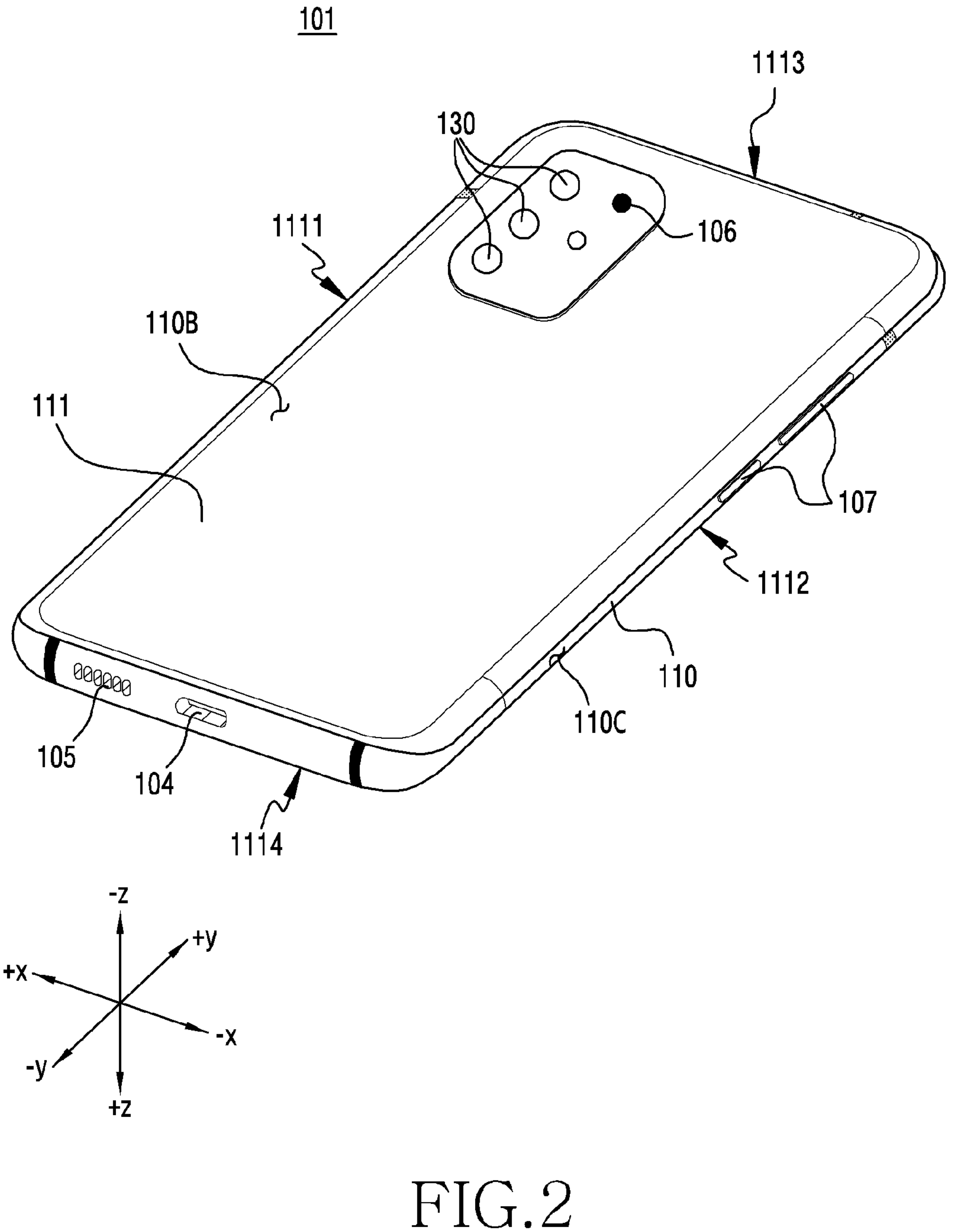
FIG. 2 is a rear perspective view of an electronic device according to an embodiment.

FIG. 2 is a rear perspective view of an electronic device 101 according to an embodiment.

An electronic device 101 of FIG. 1 may correspond to an electronic device 1201 of FIG. 12 described later. For example, the electronic device 101 may include a part or the whole of components constituting the electronic device 1201 of FIG. 12.

Referring to FIGS. 1 and 2, in connection with a speaker device according to an embodiment of the disclosure, an example, in which the speaker device is provided in an electronic device of a bar type, is disclosed. However, the speaker device may be applied to other electronic devices provided with a speaker device, such as a slidable type, a rollable type, and a foldable type, and may not be limited thereto.

Referring to FIGS. 1 and 2, the electronic device 101 according to an embodiment may include a housing 110 including a first surface 110A (or a front surface), a second surface 110B (or a rear surface), and a side surface 110C (or a side wall) configured to surround a space between the first surface 110A and the second surface 110B. In another embodiment, the housing 110 may be referred to as a structure configured to form a part of the first surface 110A, the second surface 110B, and the side surface 110C.

According to an embodiment, the first surface 110A may be formed by a front plate 121 (e.g., a glass plate including various coating layers or a polymer plate), at least a portion of which is substantially transparent. In an embodiment, the front plate 121, at least a side edge portion thereof, may include a curved-surface portion configured to be bent from the first surface 110A toward a rear plate 111 and to seamlessly extend therefrom.

In an embodiment, the second surface 110B may be formed by the rear plate 111 substantially opaque. In an embodiment, the rear plate 111 may be formed of coated or colored glass, ceramic, polymer, metal (e.g., aluminum, stainless steel (STS), or magnesium), or a combination of at least two of the above materials. In an embodiment, the rear plate 111, at least a side edge portion thereof, may include a curved-surface portion configured to be bent from the second surface 110B toward the front plate 121 and to seamlessly extend therefrom.

In an embodiment, the side surface 110C may be formed by a side member (e.g., a side bezel structure or a side wall) which is coupled to the front plate 121 and the rear plate 111 and includes a metal and/or polymer. In an embodiment, the side surface 110C may include a first side surface 1111 which is positioned at the right side (e.g., the +x direction of FIG. 1) of the electronic device 101 and extends along a first direction (e.g., the +y direction of FIG. 1), a second side surface 1112 which is parallel to the first side surface 1111 and extends along the first direction, a third side surface 1113 which extends along a second direction (e.g., the +x direction of FIG. 1) vertical to the first direction and connects one end (e.g., one end of the +y direction of FIG. 1) of the first side surface 1111 and one end (e.g., one end of the +y direction of FIG. 1) of the second side surface 1112, and/or a fourth side surface 1114 which is parallel to the third side surface 1113 and connects the other end (e.g., one end of the −y direction of FIG. 1) of the first side surface 1111 and the other end (e.g., one end of the −y direction of FIG. 1) of the second side surface 1112.

According to an embodiment, the electronic device 101 may include at least one of a display 120, a first optical sensor 103 (e.g., a sensor module and/or a camera module), a connector hole 104, or an audio module 105. In an embodiment, at least one element may be omitted from the electronic device 101, or other elements may be additionally included therein. For example, the electronic device 101 may further include a sensor module not illustrated. A key input device 107 may be omitted from the electronic device 101.

In an embodiment, within a region provided by the front plate 121, a sensor such as a proximity sensor, an illuminance sensor, an image sensor, or an iris sensor may be integrated to the display 120, or may be disposed at a position adjacent to the display 120.

In an embodiment, the display 120 may be visually exposed through a significant portion of the front plate 121. In an embodiment, the display 120 may be coupled to or may be adjacently disposed to a touch detection circuit, a pressure sensor capable of measuring the intensity (pressure) of a touch, and/or a digitizer for detecting a stylus pen of a magnetic field type. In an embodiment, the corner of the display 120 may be formed to have a shape which is generally the same as an outer peripheral shape (e.g., a curved-surface) adjacent to the front plate 121.

In an embodiment, the connector hole 104 may accommodate a connector for transmitting or receiving power and/or data to or from an external electronic device (e.g., the electronic devices 1202 and 1204 of FIG. 12), and/or a connector for transmitting or receiving an audio signal to or from an external electronic device. For example, the connector hole 104 may include a universal serial bus (USB) connector or an earphone jack (not shown) (or "an earphone interface"). In an embodiment, a USB connector and an earphone jack may be implemented as one hole, and in other one embodiment, the electronic device 101 may be configured to transmit or receive power and/or data to or from an external electronic device or to transmit or receive audio signal, without a separate connector hole.

In an embodiment, the audio module 105 may include a microphone hole and a speaker hole. A microphone for acquiring an external sound may be disposed inside the microphone hole, and multiple microphones may be arranged therein to be able to detect the direction of sound. In another embodiment, the speaker hole and the microphone hole may be implemented as one hole, or a speaker (e.g., a piezo speaker) may be included without a speaker hole. The speaker hole may include an external speaker hole and a receiver hole for a call.

In an embodiment, the key input device 107 may be disposed on the side surface 110C of the housing 110. In an embodiment, the electronic device 101 may not include a part or the whole part of the key input device 107 mentioned above, and the key input device 107 not included therein may be implemented in other type such as a soft key on the display 120. In an embodiment, the key input device 107 may include at least a part of a fingerprint sensor disposed on the second surface 110B of the housing 110.

In an embodiment, a second optical sensor 130 and a third optical sensor 106 may be arranged on the second surface 110B of the electronic device 101. The second optical sensor 130 may include multiple cameras. In an embodiment, the third optical sensor 106 may include a flash. In an embodiment, the first optical sensor 103, the second optical sensor 130, and the third optical sensor 106 may include one lens or multiple lenses, an image sensor, and/or an image processor. The third optical sensor 106 may include a light-emitting diode or a xenon lamp. In an embodiment, two or more lenses (e.g., an infrared camera, a wide-angle lens, and/or a telephoto lens) and image sensors may be arranged on one surface of the electronic device 101.

In an embodiment, the electronic device 101 may include a sensor module not illustrated therein, and thus an electronic signal or a data value, which corresponds to an internal operation state thereof or an external environment state, may be generated. The electronic device 101 may further include a sensor module not shown, for example, at least one of a gesture sensor, a gyro sensor, a barometric pressure sensor, a magnetic sensor, an acceleration sensor, a grip sensor, a color sensor, an infrared (IR) sensor, a temperature sensor, or a humidity sensor.

Figure 3:
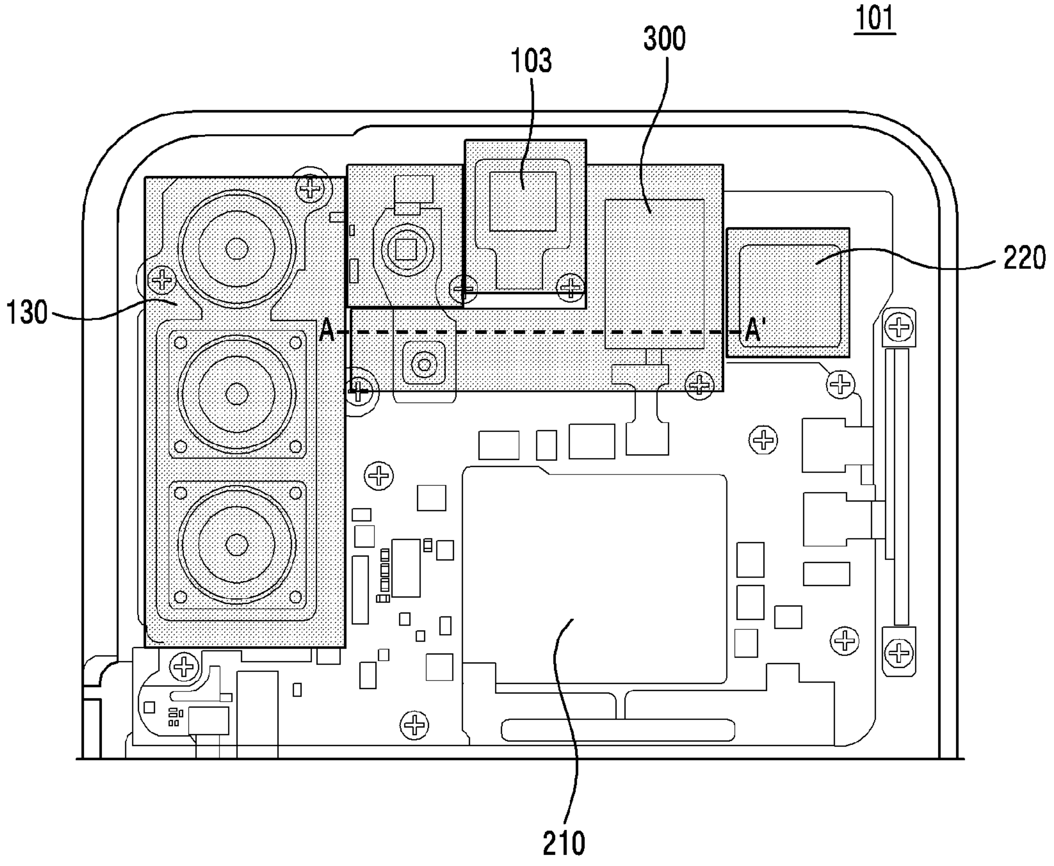
FIG. 3 is a projective view illustrating an arrangement relation between internal components of an electronic device according to an embodiment.

FIG. 3 is a projective view illustrating an arrangement relation between internal components of an electronic device 101 according to an embodiment.

At least one of elements of an electronic device 101 may be the same as or similar to at least one of elements of the electronic device 101 of FIG. 1 or FIG. 2, and overlapping descriptions will be omitted hereinafter.

Referring to FIG. 3, in an embodiment, a first optical sensor 103, a second optical sensor 130, a circuit board 210, a motor 220, and a speaker module 300 may be arranged in an inner space of the electronic device 101.

In an embodiment, the circuit board 210 may be disposed in at least a part of the housing 110. The circuit board 210 may include a processor (e.g., the processor 1220 of FIG. 12) required for an operation of the electronic device 101, a memory (e.g., the memory 1230 of FIG. 12), a communication circuit (e.g., the communication module 1290 of FIG. 12), a power management module (e.g., the power management module 1288 of FIG. 12), and/or an interface (e.g., the interface 1277 of FIG. 12).

In an embodiment, the circuit board 210 may include at least one of a printed board assembly (PBA), a printed circuit board (PCB), or a flexible printed circuit board (FPCB).

In an embodiment, the circuit board 210 may be electrically connected to the speaker module 300, and may be provided to output audio data or a voice/sound signal through a speaker (e.g., the speaker unit 301 of FIG. 4, described later).

In an embodiment, the speaker module 300 may convert an electric signal into a sound signal, and may output a sound through an output part (e.g., a diaphragm).

Figure 4:
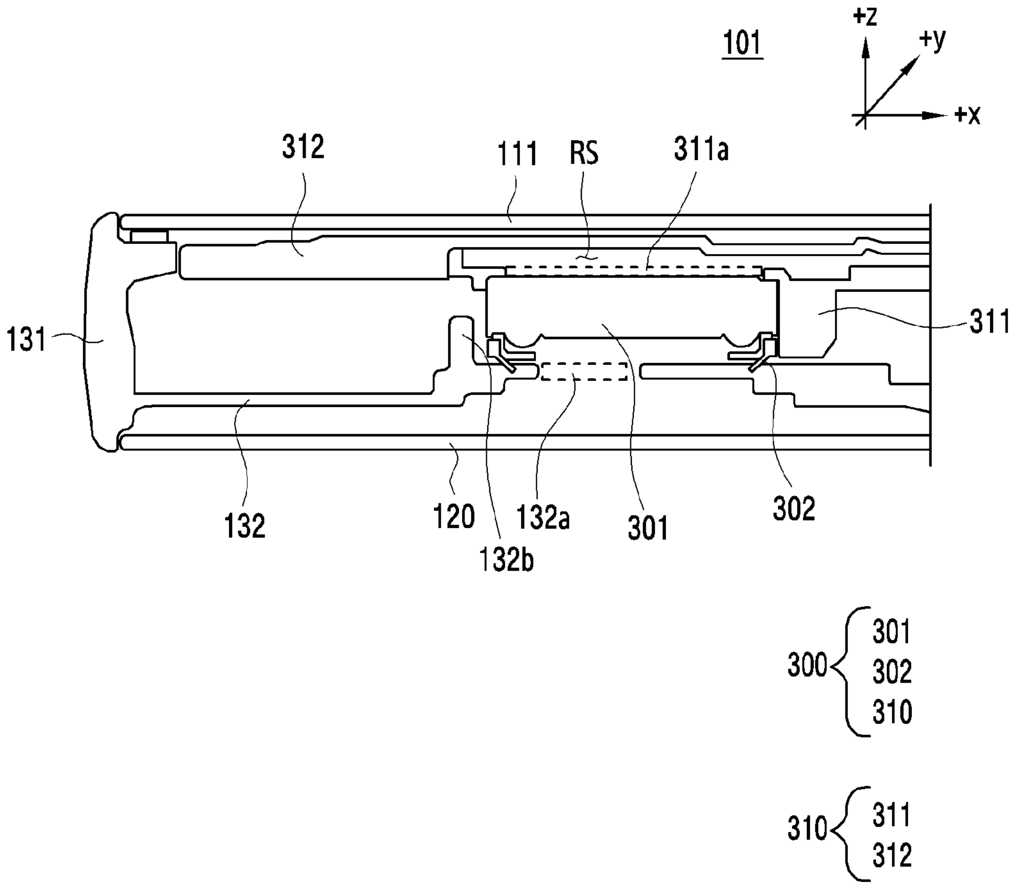
FIG. 4 illustrates a partial sectional view taken along line A-A' of FIG. 3 according to an embodiment.

FIG. 4 illustrates a partial sectional view taken along line A-A' of FIG. 3 according to an embodiment.

Referring to FIG. 4, the z-axis may mean the thickness direction of an electronic device 101. In an embodiment, the z-axis may include a first direction (e.g., the +z direction) and a second direction (e.g., the −z direction).

Referring to FIG. 4, the electronic device 101 may include a rear plate 111, a side bezel structure 131, a support member 132, a display 120, or a speaker module 300. In an embodiment, at least a portion of the speaker module 300 may be disposed between the support member 132 and the rear plate 111. In an embodiment, the speaker module 300 may be referred to as a speaker module structure or a speaker assembly.

In an embodiment, the side bezel structure 131 may be formed to at least partially surround a space between the front surface (e.g., the first surface 110A of FIG. 1) and the rear surface (e.g., the second surface 110B of FIG. 2) of the electronic device 101. In an embodiment, the side bezel structure 131 may form at least a part of the side surface (e.g., the side surface 110C of FIG. 1) of the electronic device 101. In an embodiment, the side bezel structure 131 may include a metal and/or polymer, and may have a frame configured to substantially form the side surface of the electronic device 101. In an embodiment, when the side bezel structure 131 includes a metal material, a part of the metal material portion thereof may be insulated from other portions, and may be utilized as an antenna for transmitting or receiving a wireless signal.

In an embodiment, the support member 132 may be disposed in an inner space of the electronic device 101. For example, the support member 132 may be disposed in a region or a space surrounded by the side bezel structure 131. In an embodiment, the support member 132 may be formed in a flat plate shape, one surface of which is positioned to substantially face the inner surface of the display 120.

In an embodiment, even though the side bezel structure 131 is described separately from the support member 132, the support member 132 may be integrally formed with the side bezel structure 131. For example, multiple metallic material portions and synthetic resin material portions may be combined through processes such as die casting, insert injection, or lathe processing, and therefore the side bezel structure 131 and the support member 132 may be integrally formed with each other. In an embodiment, a part of the metallic portions of the side bezel structure 131 or the support member 132 may function as an antenna. In another embodiment, the support member 132 may be manufactured separately with respect to the side bezel structure 131, and may be assembled and mounted to an inner side of the side bezel structure 131.

In an embodiment, the support member 132 may include an opening 132*a*. In an embodiment, the opening 132*a* may be formed to extend through from one surface (e.g., a surface facing the inner surface of the display 120) of the support member 132 to the other surface (e.g., a surface facing a direction opposite to one surface of support member 132) of the support member 132. In an embodiment, the support member 132 may include a flange 132*b* configured to extend from the other surface of support member 132. In an embodiment, a sound output from the speaker unit 301 may be output to the outside through the opening 132*a*.

In an embodiment, the speaker module 300 may include a structure 310, a speaker unit 301, a protective member 302, and a resonance space RS. In an embodiment, at least a part of the resonance space RS may be filled with an adsorption material.

In an embodiment, the structure 310 may include a first structure 311 and a second structure 312. The structure 310 may be referred to as a carrier 310 or a housing 310.

Referring to FIG. 4, the speaker module 300 may be a separate structure including the speaker unit 301 and the structure 310, and may be provided in a structure configured to block a rear sound of the speaker unit 301 by means of the first structure 311 and the second structure 312.

Referring to FIG. 4, the protective member 302, the speaker unit 301, the first structure 311, and the second structure 312 may be sequentially arranged from the support member 132 of the electronic device 101 toward the first direction (e.g., the +z direction).

In an embodiment, the second structure 312 may be formed in a flat plate shape positioned to face the inner surface of the rear plate 111. The first structure 311 may have a flat plate shape, and may be disposed to face at least a part of the second structure 312 so as to be coupled thereto. In an embodiment, the first structure 311 may include a first groove formed in the first direction (e.g., the +z direction). In another embodiment, the second structure 312 may include a second groove formed in the second direction (e.g., the −z direction). In an embodiment, when the first structure 311 and the second structure 312 have been coupled, the resonance space RS may be formed by the first groove and/or the second groove.

In an embodiment, the resonance space RS may have an adsorption material injected therein. The resonance space RS, into which an adsorption material is injected, will be detailedly described with reference to FIG. 5A to FIG. 10 described later.

In an embodiment, the first structure 311 may include a rib structure formed in the second direction (e.g., the −z direction) to allow the speaker unit 301 to be stably seated thereon.

In an embodiment, the first structure 311 may include an opening 311*a* to enable one surface of the seated speaker unit 301 to correspond to the resonance space RS. In an embodiment, the opening 311*a* may be formed to extend through from one surface (e.g., a surface facing the second structure 312) of the first structure 311 to the other surface (e.g., a surface facing a direction opposite to one surface of the first structure 311) of the first structure 311. In an embodiment, the rib structure of the first structure 311 may be formed in a region adjacent to one side and the other side of the opening 311*a*. In an embodiment, the speaker unit 301 may be stably seated on the rib structure, and one surface of the speaker unit 301 may form the resonance space RS together with the first structure 311 and the second structure 312.

In an embodiment, the speaker unit 301 may be provided in a substantially hexahedral shape. In an embodiment, the speaker unit 301 may include a magnetic circuit including a yoke and a magnet, a voice coil positioned in an air gap of the magnet circuit, a side diaphragm and a center diaphragm vibrated by the voice coil, a suspension configured to guide movements of the voice coil and the diaphragms, and a component such as a terminal pad configured to receive an electrical signal from the outside so as to deliver an electrical signal to the voice coil through the suspension. However, the configuration or shape of the speaker unit 301 may not be limited thereto.

In an embodiment, the protective member 302 may be attached and/or coupled to the other surface (e.g., a surface opposite to one surface of the speaker unit 301 forming the resonance space RS) of the speaker unit 301. In an embodiment, the protective member 302 may be configured to allow the sound of the speaker unit 301 to pass therethrough. In an embodiment, the protective member 302 may be a cover for protecting the speaker unit 301 from the outside. In an embodiment, the protective member 302 may be a member made of an elastic material, which has a structure configured to prevent foreign materials from being introduced into the electronic device 101 in which the speaker module 300 is installed. For example, the protective member 302 may include at least one of a liquid injection silicone rubber (LSR), silicon, or rubber. The protective member 302 may not be limited thereto, and may include a rigid material or stainless steel (STS).

In an embodiment, the display 120 may be disposed on one surface of the support member 132 to output a screen to the front direction of the electronic device 101.

Figure 5A:
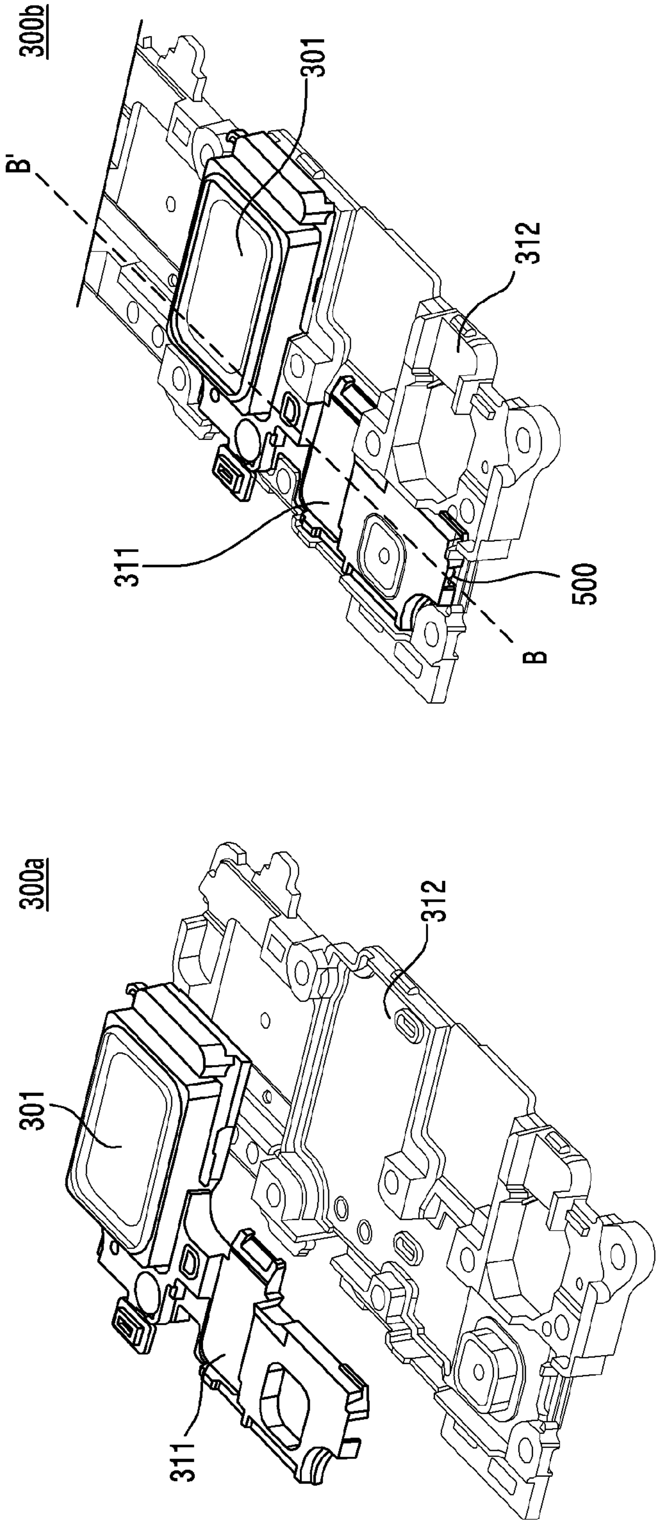
FIG. 5A illustrates a first state and a second state of a speaker module according to an embodiment.

FIG. 5A illustrates a first state 300*a* and a second state 300*b* of a speaker module 300 according to an embodiment.

Referring to FIG. 5A, a first state 300*a* of a speaker module 300 may be a state in which a first structure 311 and a second structure 312 are separated from each other. A second state 300*b* of the speaker module 300 may be a state in which the first structure 311 and the second structure 312 are coupled to each other.

In an embodiment, the first structure 311 may have a first size and the second structure 312 may have a second size greater than the first size, but the sizes thereof may not be limited thereto. In an embodiment, the second structure 312 may include a first region corresponding to the first structure 311, and a second region except for the first region.

In an embodiment, the first structure 311 and the second structure 312 may be coupled to each other. In an embodiment, the first structure 311 and the second structure 312 each may include a protrusion, a recess, and/or a groove. For example, the second structure 312 may include at least one protrusion in a direction facing the first structure 311. The first structure 311 may include at least one groove for receiving the at least one protrusion of the second structure 312.

In an embodiment, the first structure 311 and the second structure 312 may be fixed by at least one process of an ultrasonic welding process, a double-sided tape process, a bonding process.

In an embodiment, the resonance space may be formed in the second state 300*b* of the speaker module 300 by a groove formed on the first structure 311 or the second structure 312.

Referring to FIG. 5A, the speaker module 300 may include an opening 500 for injecting an adsorption material (e.g., the adsorption material 803 of FIG. 8 described later) into the resonance space RS formed by coupling between one surface of the first structure 311, one surface of the second structure 312, and one surface of the speaker unit 301.

Figure 5B:
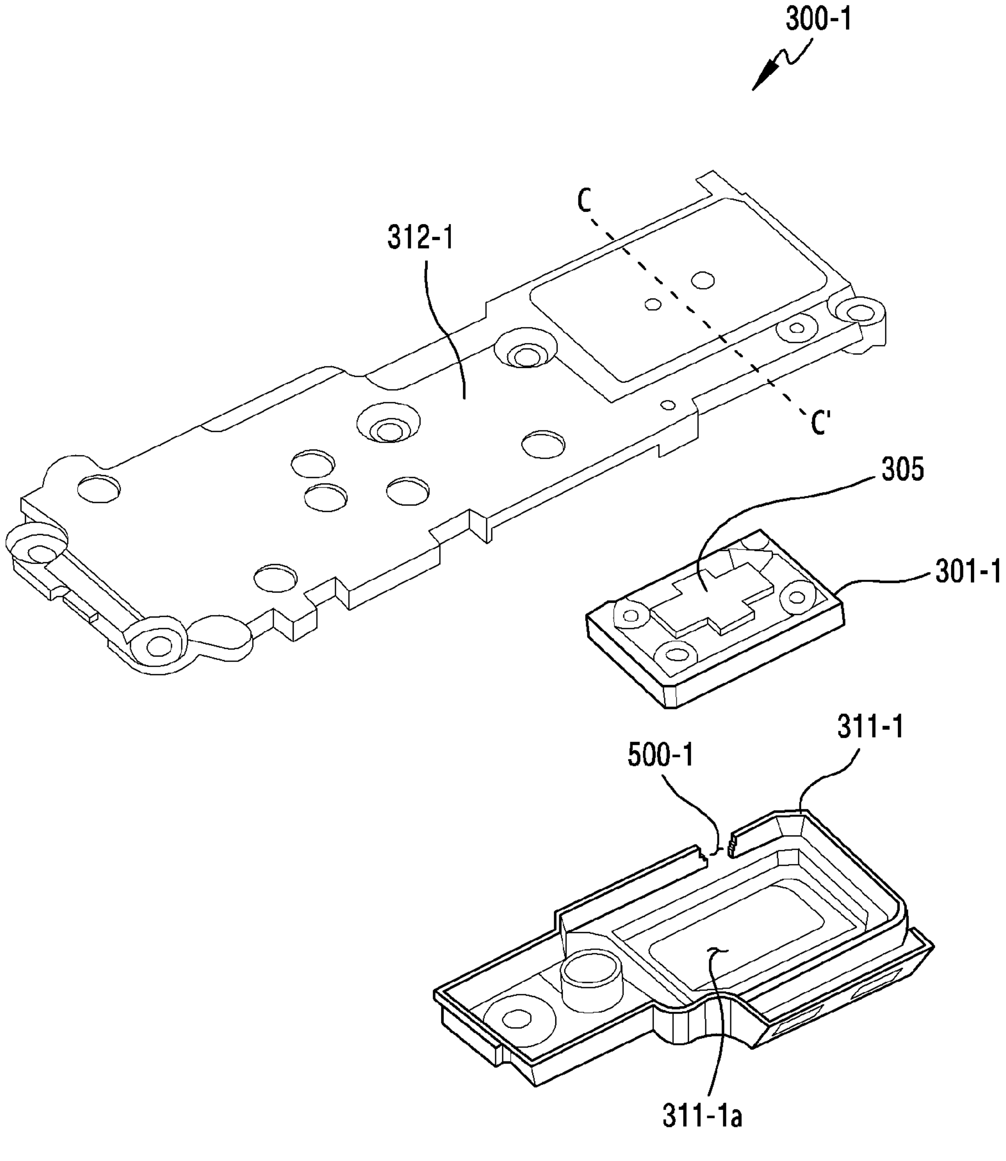
FIG. 5B illustrates a speaker module according to another embodiment.

FIG. 5B illustrates a speaker module 300-1 according to an embodiment.

A speaker module 300-1 of FIG. 5B may have a partial structural difference with respect to the speaker module 300 of FIG. 5A, and other elements and functions except for those may be identically applied thereto.

Referring to FIG. 5B, in an embodiment, the speaker module 300-1 may include a first structure 311-1, a second structure 312-1, a speaker unit 301-1, and protective member 305.

In an embodiment, when the first structure 311-1 and the second structure 312-1 have been coupled, the speaker unit 301-1 may have a resonance space RS formed by a groove formed on the first structure 311-1 or second structure 312-1. In an embodiment, the speaker unit 301-1 may be disposed in the resonance space RS. In an embodiment, the speaker unit 301-1 may be disposed in at least a region of the resonance space RS.

In an embodiment, the first structure 311-1 may include an opening 311-1*a* to allow the speaker unit 301-1 to be disposed in at least a region of the resonance space RS. In an embodiment, at least a part of the speaker unit 301-1 may be disposed in a region corresponding to the opening 311-1*a* of the first structure 311-1. In an embodiment, the opening 311-1*a* may be formed to extend through from one surface (e.g., a surface facing the second structure 312-1) of the first structure 311-1 to the other surface (e.g., a surface opposite to one surface of the first structure 311-1) of the first structure 311-1.

Figure 6A:
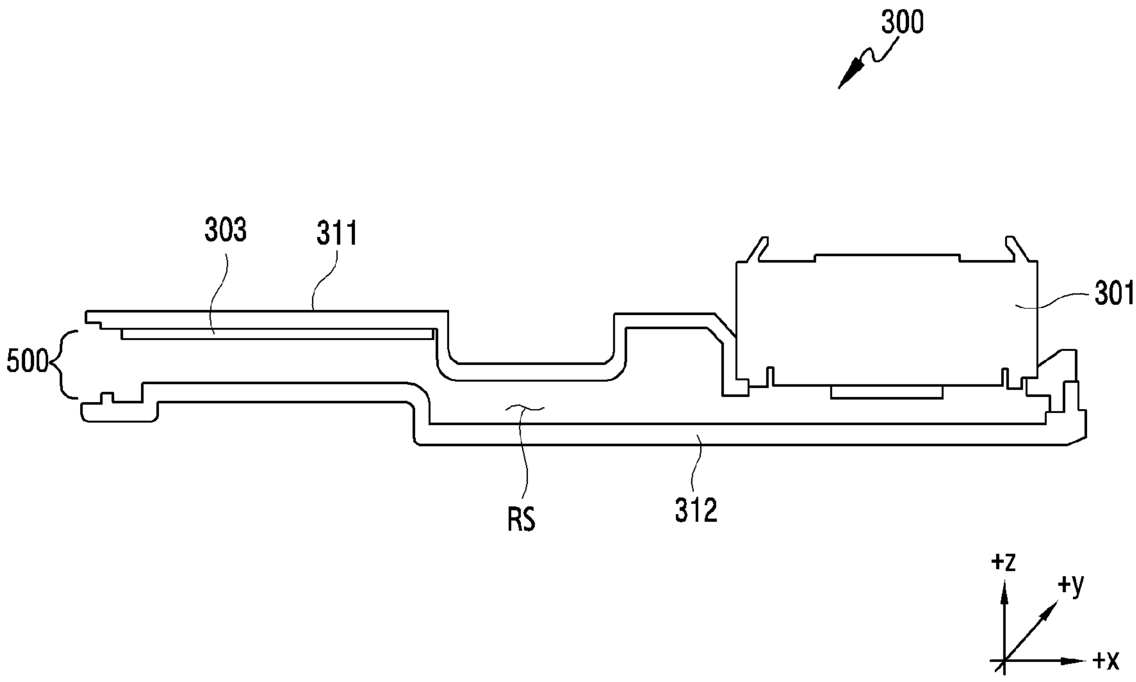
FIG. 6A illustrates a sectional view taken along line B-B' in the second state of the speaker module of FIG. 5A according to an embodiment.

FIG. 6A illustrates a sectional view taken along line B-B' in the second state 300*b* of the speaker module 300 of FIG. 5A according to an embodiment.

Referring to FIG. 6A, in an embodiment, the speaker module 300 may include a sound absorption sheet 303 and an opening 500.

In an embodiment, the resonance space RS may be formed in the second state 300*b* of the speaker module 300 by at least one groove formed on the first structure 311 and/or the second structure 312. In an embodiment, an adsorption material may be injected into the resonance space RS. In an embodiment, the adsorption material may be a porous material for discharging, condensing, or adsorbing a part of air inside the resonance space RS. For example, the adsorption material may be configured by mixing a binder with at least one of a granular active carbon, which has various sizes and is the activated carbon series, a powdered activated carbon, or an ARCP. For another example, the adsorption material may be configured by mixing a binder with Cu, Po1, Zr1, Zr2, or Al particles having a metal organic frameworks structure. Still another example, the adsorption material may be configured by mixing a binder with at least one of an element of the series of diatomaceous earth, an element of the series of pearlite or silicon dioxide, or an element of the series of zeolite.

In an embodiment, the speaker module 300 may include the opening 500 for injecting the absorption material thereinto. In an embodiment, the opening 500 may be defined as a closed loop formed by coupling between the first structure 311 and the second structure 312. In an embodiment, the area of the opening 500 may be determined in consideration of the size of the adsorption material. For example, the area of the opening 500 may be 1.15 $mm^2$ or more. In an embodiment, the shape of the closed loop of the opening 500 including a part of the first structure 311 and a part of the second structure 312 will be detailedly described with reference to FIG. 7.

In an embodiment, the opening 500 may be a through-hole configured to connect the resonance space RS in a space outside the resonance space RS. In an embodiment, the adsorption material may be injected through the opening 500 disposed on the left side surface (e.g., the −x direction) of the speaker module 300. In an embodiment, the adsorption material injected through the opening 500 may be injected up to the resonance space RS formed by one surface of the speaker unit 301 which is stably seated in a region corresponding to the opening 311*a* of the first structure 311.

In an embodiment, an allophone may occur due to repetitive movements of the adsorption material 803 (e.g., the adsorption material 803 of FIG. 8) disposed in the resonance space RS. In an embodiment, an allophone may occur due to the friction between at least a region of the first structure 311, second structure 312, and/or the speaker unit 301, which form the resonance space RS, and the adsorption material 803.

In an embodiment, the sound absorption sheet 303 may be attached to at least one surface of the first structure 311 and second structure 312 which form the resonance space RS. In an embodiment, the sound absorption sheet 303 may be attached to at least one surface of the first structure 311 and/or the second structure 312 in the resonance space RS, so as to become substantially horizontal to the direction (e.g., the +x direction) in which the adsorption material is injected. In an embodiment, the sound absorption sheet 303 may include PORON or sponge.

In an embodiment, the sound absorption sheet 303 may prevent an allophone generated due to the adsorption material. In an embodiment, the sound absorption sheet 303 may be arranged in a direction substantially horizontal to the direction in which the adsorption material is injected, to minimize an influence on a movement of the adsorption material, and thus the adsorption material can be smoothly filled in the resonance space RS.

In an embodiment, the sound absorption sheet 303 may be configured to form a part of the resonance space RS. That is, the sound absorption sheet 303 may be attached to at least a region of the first structure 311 or the second structure 312 which form the resonance space RS.

Figure 6B:
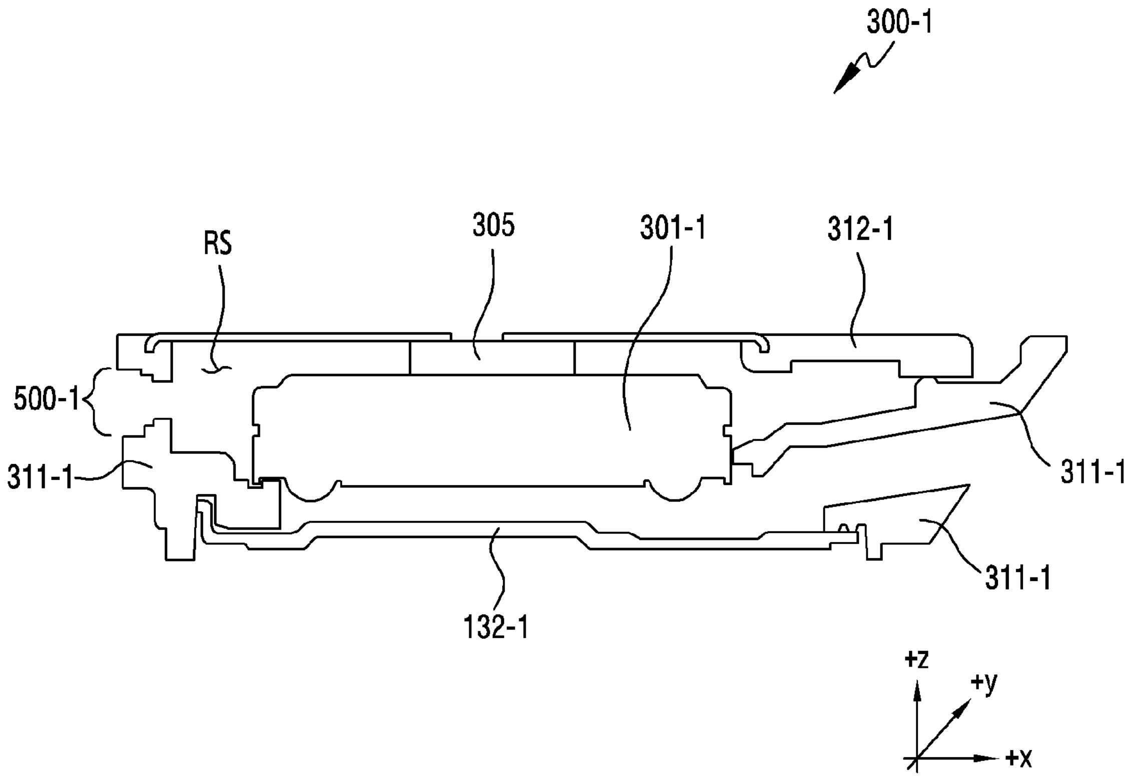
FIG. 6B illustrates a sectional view taken along line C-C' of the speaker module of FIG. 5B according to another embodiment.

FIG. 6B illustrates a sectional view taken along line C-C' of the speaker module 300-1 of FIG. 5B according to another embodiment.

FIG. 6B illustrates a coupled state of the first structure 311-1 and the second structure 312-1.

In an embodiment, the first structure 311-1 may include a rib structure formed in a first direction (e.g., the +z direction of FIG. 6B) to allow the speaker unit 301-1 to be stably seated thereon.

In an embodiment, the protective member 305 may be disposed on the upper surface (e.g., the +z direction of FIG. 6B) of the speaker unit 301-1. In an embodiment, the protective member 305 may include a material such as sponge or cotton.

Referring to FIG. 6B, the speaker module 300-1 may include an opening 500-1 for injecting an adsorption material into the resonance space RS formed by coupling between the first structure 311-1 and the second structure 312-1. In an embodiment, the opening 500-1 may be defined as a closed loop formed by coupling between the first structure 311-1 and the second structure 312-1. In an embodiment, in order to protect the speaker module 300-1, the support member 132-1 may be coupled to the first structure 311-1, or may be integrally formed with the first structure 311-1. In an embodiment, the support member 132-1 may be formed in a flat plate shape which allows one surface of the support member 132-1 to substantially face the inner surface of a display (e.g., the display 120 of FIG. 1).

Figure 7:
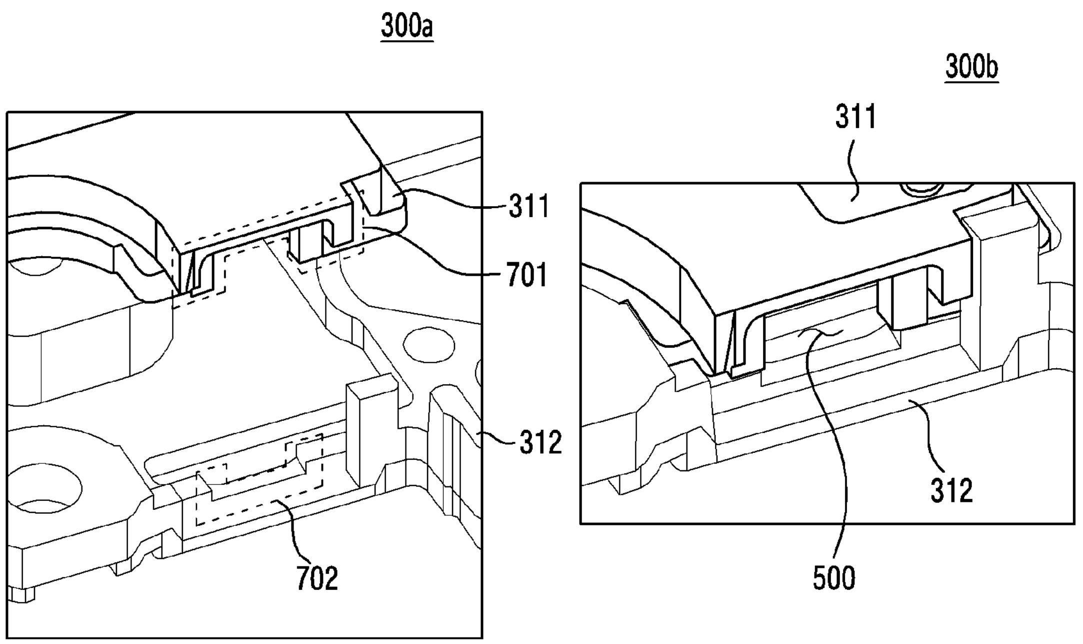
FIG. 7 illustrates an opening formed through a speaker module according to an embodiment.

FIG. 7 illustrates an opening 500 formed through a speaker module 300 according to an embodiment.

Referring to FIG. 7, the first structure 311 and/or the second structure 312 may include at least one groove for forming the resonance space RS, and in the second state 300*b* of the speaker module 300, one end of the groove formed on the first structure 311 and/or the second structure 312 may include the opening 500 formed in a closed loop.

In an embodiment, the opening 500 formed in a closed loop may include a part of the first structure 311 and a part of the second structure 312. In an embodiment, the shape of the opening 500 may be determined by a coupling structure between the first structure 311 and the second structure 312, an open loop of the first structure 311 configured to form the opening 500, and/or an open loop of the second structure 312 configured to form the opening 500. In an embodiment, the opening 500 may be formed by coupling between the open loop of the first structure 311, which corresponds to the upper part of the opening 500, and the open loop of the second structure 312, which corresponds to the lower part of the opening 500. The open loop of the first structure 311 may be the shape of a first portion 701. The open loop of the second structure 312 may be the shape of a second portion 702. For example, in a case where the open loop of the first structure 311 corresponds to a "⊓" shape in which the lower portion of a tetragon is removed, and the open loop of the second structure 312 corresponds to a "⊔" shape in which the upper portion of a tetragon is removed, the speaker module 300 may include the opening 500 formed in a closed loop having a substantially rectangular shape by coupling between the first structure 311 and the second structure 312. In an embodiment, the shape of the opening 500 formed in a closed loop may not be limited thereto. For example, the opening 500 may be a circular shape, a trapezoid shape, a triangular shape, or a polygonal shape such as a rhombus shape.

Figure 8:
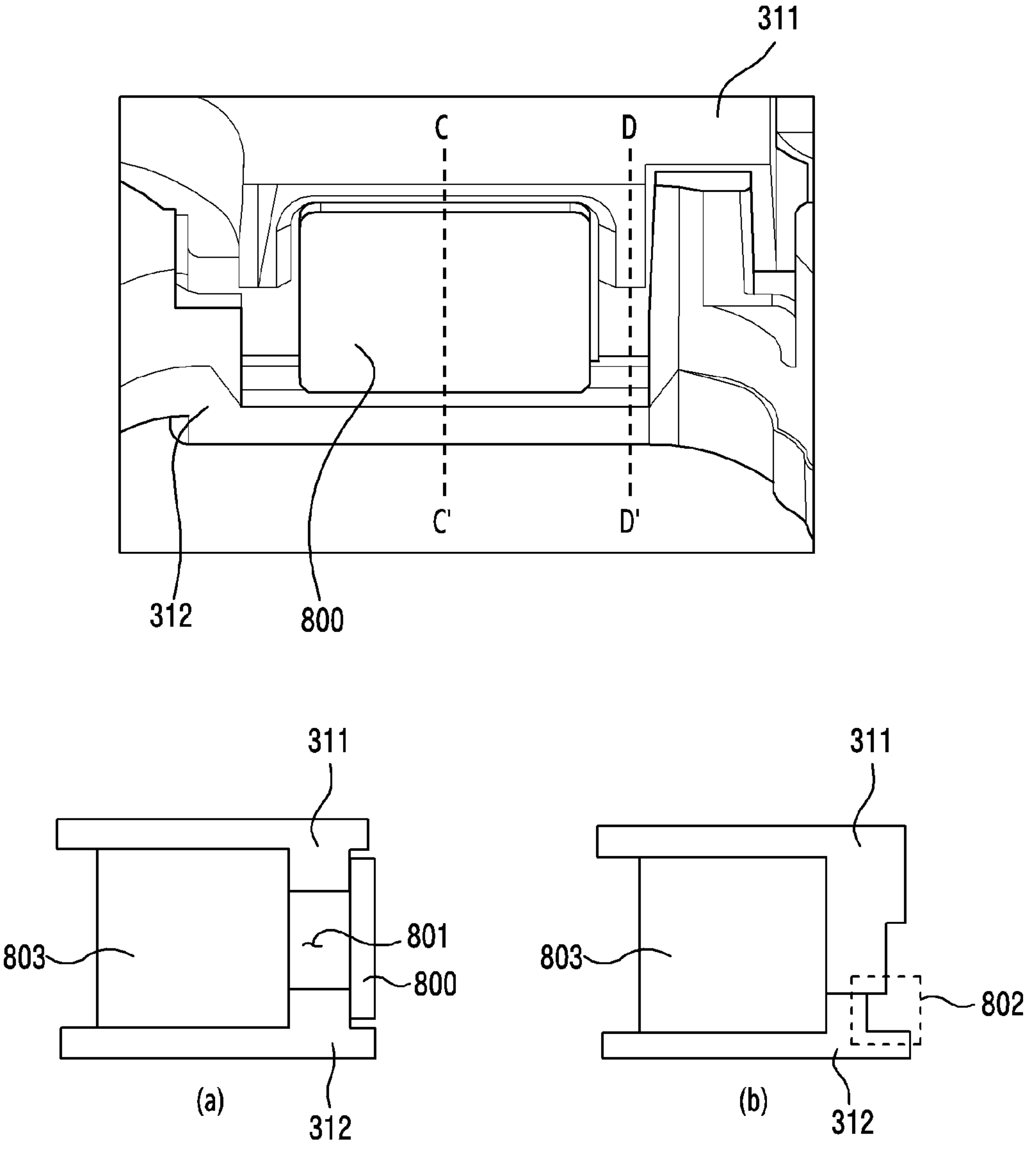
FIG. 8 illustrates a first sealing member attached to a region of a speaker module according to an embodiment.

FIG. 8 illustrates a first sealing member 800 attached to a region of a speaker module according to an embodiment.

In an embodiment, a first sealing member 800 may be disposed along the peripheral portion of the opening 500 formed by coupling between the first structure 311 and the second structure 312, to close the resonance space RS. In an embodiment, the first sealing member 800 may be attached or fixed to a region corresponding to the opening 500 of the speaker module 300 by an adhesive member (e.g., a double-sided tape). In an embodiment, the adhesive member may include a closed loop formed along the perimeter of the opening 500.

In an embodiment, the first sealing member 800 may be configured to prevent an adsorption material injected into the resonance space RS from being leaked to a region other than the resonance space RS, or to prevent foreign materials from being introduced from a region other than the resonance space RS.

In an embodiment, the first sealing member 800 may be a material having an elasticity. For example, the first sealing member 800 may include rubber.

Part (a) of FIG. 8 is a sectional view taken along line C-C' of the speaker module 300 in a region to which the first sealing member 800 is attached. Part (b) of FIG. 8 is a sectional view taken along line D-D' of the speaker module 300 in a region to which the first sealing member 800 is not attached.

In an embodiment, the first structure 311 and the second structure 312 may be coupled by assembling and/or mounting the first structure 311 to one surface of the second structure 312, and the coupling between the first structure 311 and the second structure 312 may be fixed through a process such as ultrasonic welding.

Referring to part (a) of FIG. 8, the adsorption material 803 may be injected into the resonance space RS formed by coupling between the first structure 311 and the second structure 312. In an embodiment, the resonance space RS may include a remaining space 801 remaining after the adsorption material 803 has been injected. In an embodiment, a space compensation material (not shown) may be injected into the remaining space 801 remaining after the adsorption material 803 has been injected. In an embodiment, the space compensation material may include a movement prevention material for the adsorption material 803, which is provided for reducing an allophone generated by a movement of the adsorption material 803. The movement prevention material for the adsorption material 803 may include a sponge or cotton. In another embodiment, the space compensation material may be a material which has a different particle size from and is the same as the adsorption material 803, or may be an air adsorption material having a different material from the adsorption material 803.

Referring to part (b) of FIG. 8, when the first structure 311 and the second structure 312 are coupled and/or fixed, due to an error caused by a manufacturing process or an assembling process of the first structure 311 and/or the second structure 312, a distancing space or a step may occur in a region 802 in which the first structure 311 and the second structure 312 are in contact with each other.

In an embodiment, if a distancing space or a step occurs in the region 802 in which the first structure 311 and the second structure 312 are in contact with each other, in order to couple and/or fix the first structure 311 and the second structure 312, a bond or a welding horn, which is arranged between the first structure 311 and the second structure 312, may overflow through the distancing space or the step.

In an embodiment, a second sealing member (e.g., the second sealing member 900 of FIG. 9 described later) for compensating a distancing space or a step generated by coupling between the first structure 311 and the second structure 312 may be disposed in the speaker module 300.

Figure 9:
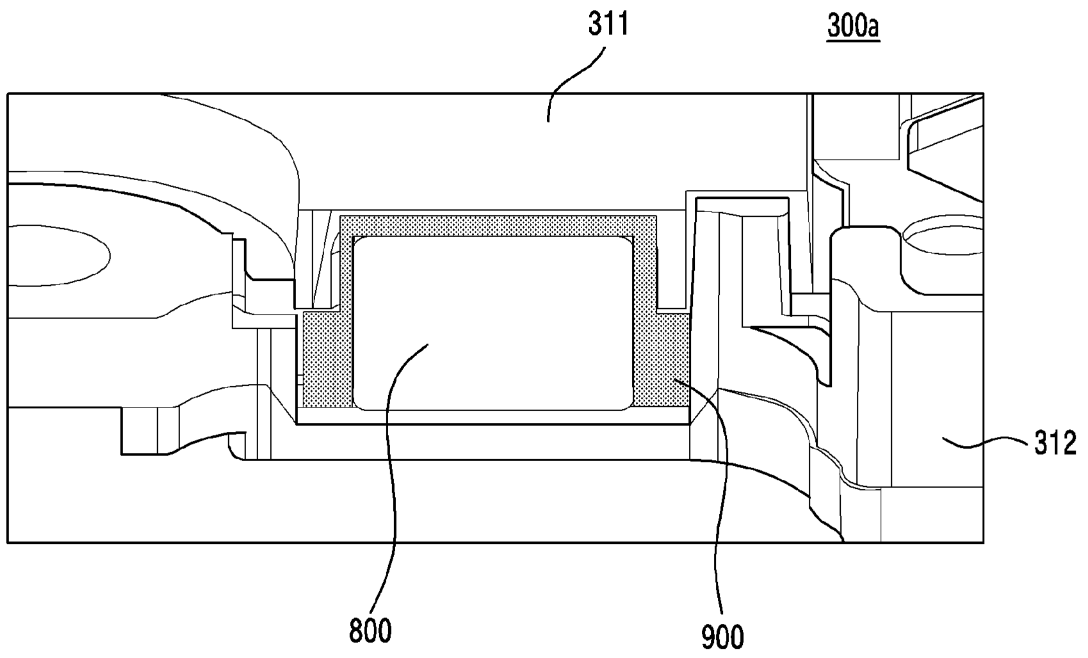
FIG. 9 illustrates a second sealing member attached to a speaker module according to an embodiment.

FIG. 9 illustrates a second sealing member 900 attached to a speaker module 300 according to an embodiment.

Referring to FIG. 9, in order to compensate a distancing space or a step generated by coupling between the first structure 311 and the second structure 312, a second sealing member 900 may be disposed in at least a region of the speaker module 300.

In an embodiment, in order to close the resonance space RS, the second sealing member 900 may be disposed in a region surrounding the first sealing member 800 which is attached or fixed to a region corresponding to the opening 500. In an embodiment, the second sealing member 900 may prevent the adsorption material or the space compensation material arranged in the resonance space RS from being leaked through the distancing space or the step between the first sealing member 800 and the opening 500.

In an embodiment, the second sealing member 900 may include a eutectic bond and/or a polymer adhesive.

Figure 10:
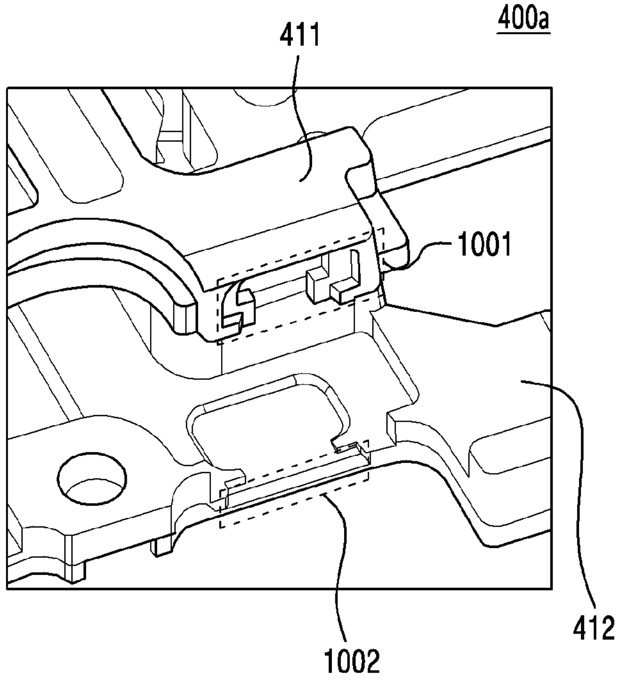
FIG. 10 illustrates an opening formed through a speaker module according to another embodiment.
Figure 10:
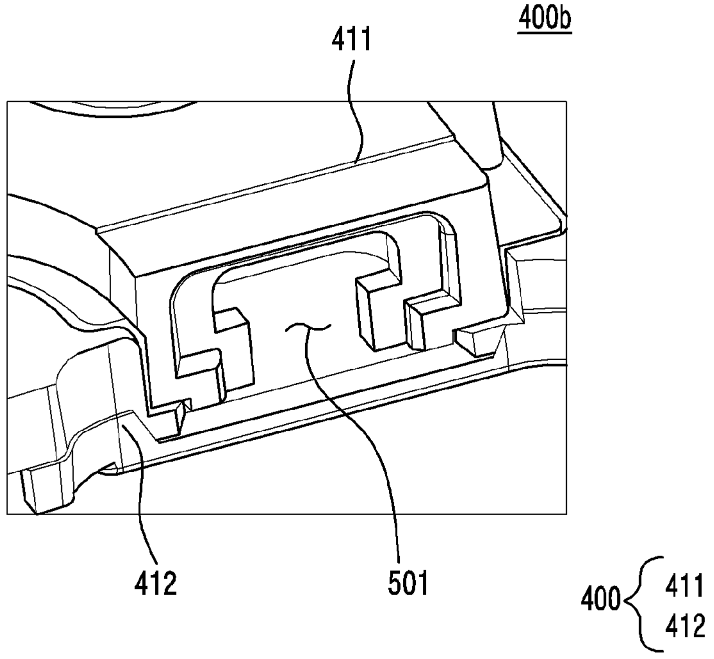

FIG. 10 illustrates an opening formed through a speaker module 400 according to another embodiment.

Referring to FIG. 10, a speaker module 400 may be different from the speaker module 300 of FIG. 7 in an opening forming a closed loop, and other elements may be identically applied thereto.

In an embodiment, the speaker module 400 may include a first structure 411, a second structure 412, and an opening 501.

Referring to FIG. 10, a first state 400*a* of the speaker module 400 may be a state in which the first structure 411 and the second structure 412 are separated. A second state 400*b* of the speaker module 400 may be a state in which the first structure 411 and the second structure 412 are coupled.

In an embodiment, the speaker module 400 may include the opening 501 which forms a closed loop for injecting an adsorption material by coupling between the first structure 411 and the second structure 412. In an embodiment, the opening 501 may include a part of the first structure 411 and a part of the second structure 412. In an embodiment, the opening 501 may be formed by coupling between an open loop of the first structure 411, which corresponds to the upper part of the opening 501, and an open loop of the second structure 412, which corresponds to the lower part of the opening 501. The open loop of the first structure 411 may be the shape of a first portion 1001. The open loop of the second structure 412 may be the shape of a second portion 1002. For example, in a case where the open loop of the first structure 411 has a “ ” shape similar to alphabet letter “T”, and the open loop of the second structure 412 has a “—” shape which is a horizontally lying bar shape, the speaker module 400 may include the opening 501 defined as a closed loop having a “ ” shape which is alphabet letter “T”.

Figure 11:
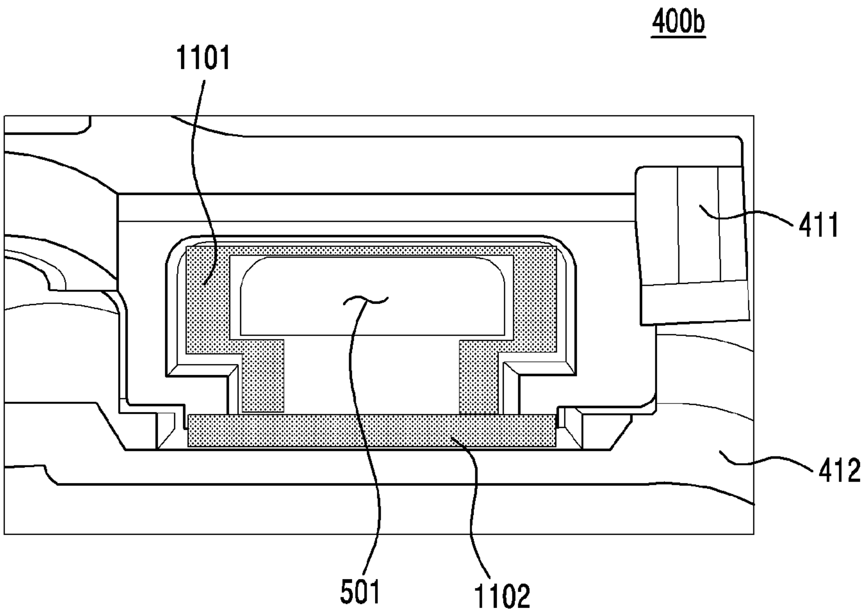
FIG. 11 illustrates a region to which a first sealing member is attached, and a region to which a second sealing member is attached, according to another embodiment.
Figure 11:
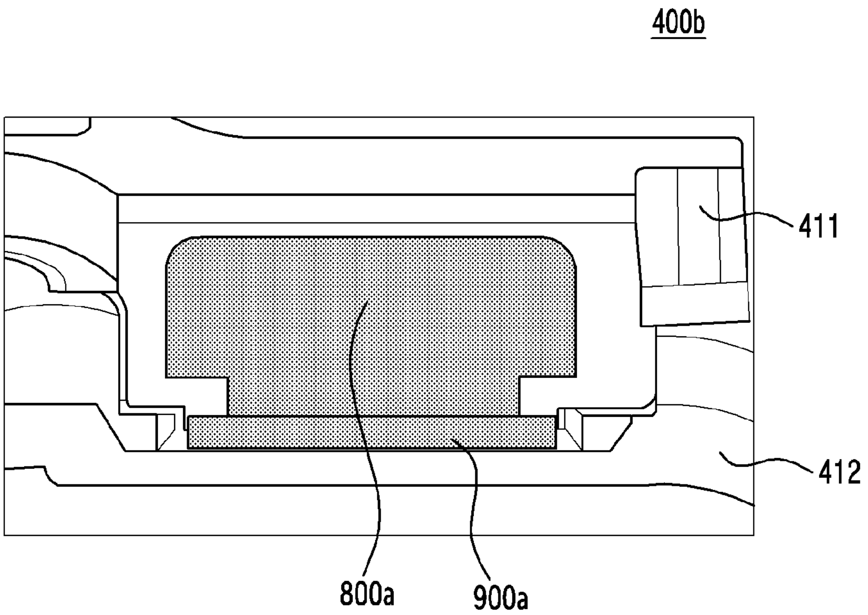

FIG. 11 illustrates a region 1101 to which a first sealing member 800*a* is attached, and a region 1102 to which a second sealing member 900*a* is attached, according to another embodiment.

In an embodiment, the speaker module 400 may include a first sealing member 800*a* and a second sealing member 900*a*.

Referring to FIG. 11, the first sealing member 800*a* may be disposed along the peripheral portion of the opening 501 formed by coupling between the first structure 411 and the second structure 412. In an embodiment, the first sealing member 800*a* may be attached or fixed to a region corresponding to the opening 501 by an adhesive member (e.g., a double-sided tape). In an embodiment, the adhesive member may be attached to a region 1101 formed along the perimeter of the first structure 411 so as to enable the first sealing member 800*a* to be coupled to a region corresponding the opening 501.

In an embodiment, the first sealing member 800*a* may be formed to correspond to the shape of the opening 501. For example, if the opening 501 is alphabet letter “T” shape, the first sealing member 800*a* may be the “T” shape to correspond to the shape of the opening 501.

In an embodiment, when the first structure 411 and the second structure 412 are coupled and/or fixed, a distancing space or a step may occur in a portion in which the first structure 411 and the second structure 412 are in contact with each other. In an embodiment, the speaker module 400 may have the second sealing member 900*a* disposed in the speaker module 400 in order to compensate a distancing space or a step generated by coupling between the first structure 411 and the second structure 412. In an embodiment, the second sealing member 900*a* may be disposed in a region 1102 in which the first structure 411 and the second structure 412 are in contact with each other.

Figure 12:
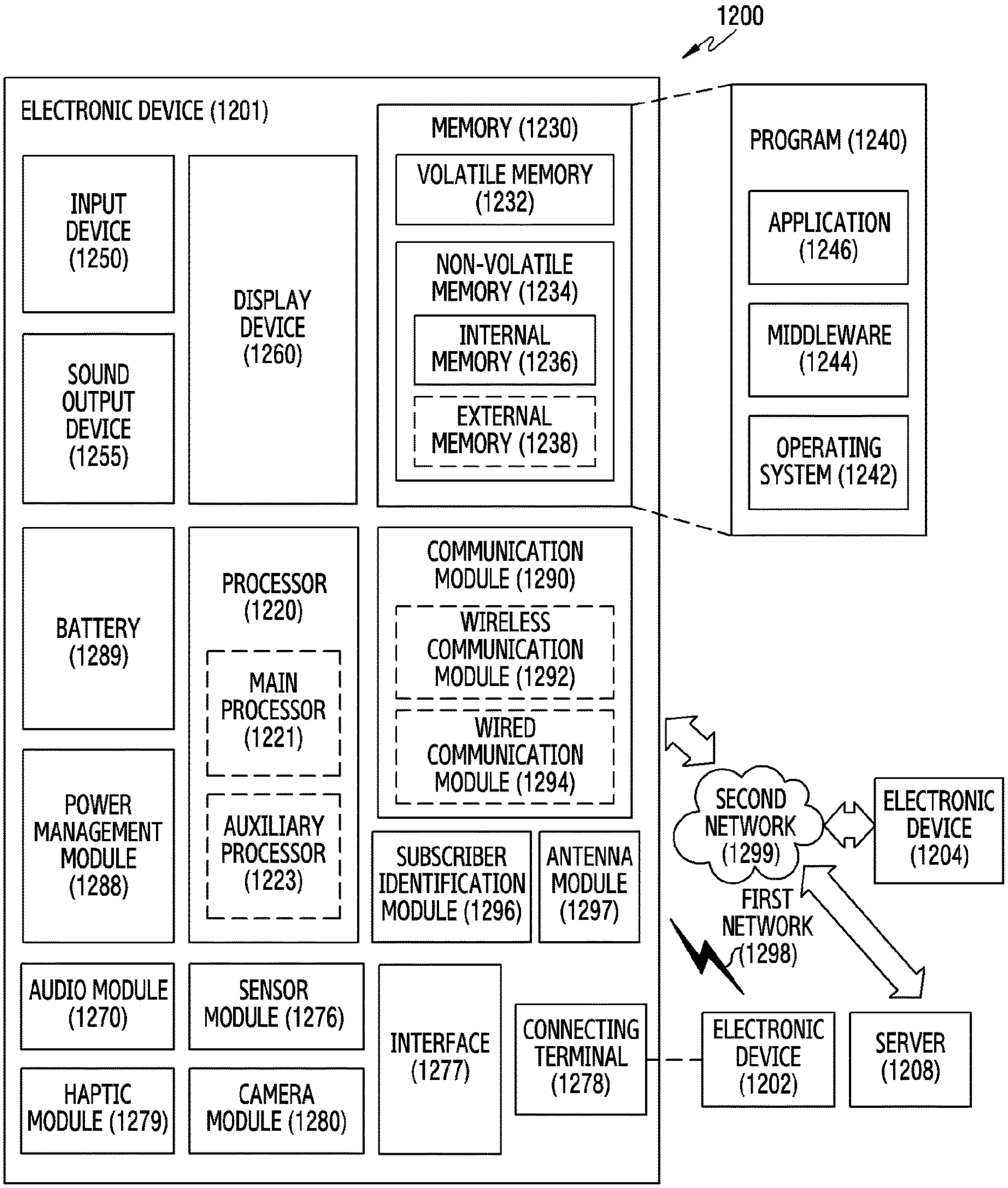
FIG. 12 is a block diagram of an electronic device in a network environment according to various embodiments.

FIG. 12 is a block diagram illustrating an electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a USB interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, an SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299.

The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A speaker module structure according to various embodiments may include a first structure (e.g., the first structure 311), a second structure (e.g., the second structure 312) configured to couple to the first structure (e.g., the first structure 311), and a speaker (e.g., the speaker unit 301) coupled to at least one of the first structure and the second structure, wherein the second structure includes at least one groove configured to form a resonance space (e.g., the resonance space RS) by coupling between the first structure and the second structure, wherein the resonance space is connected to the speaker and has an adsorption material (e.g., the adsorption material 803) injected therein, and wherein wile the first structure and the second structure are coupled, one end of the groove includes an opening (e.g., the opening 500) formed in a closed loop including a part of the first structure and a part of the second structure.

In an embodiment, the speaker module structure may further include a first sealing member (e.g., the first sealing member 800) configured to close the opening.

In an embodiment, the speaker module structure may further include a second sealing member (e.g., the second sealing member 900) configured to close a recess formed by coupling between the first structure and the second structure.

In an embodiment, the second sealing member may include at least one of a eutectic bond or a polymer adhesive.

In an embodiment, the speaker module structure may further include a sound absorption sheet (e.g., the sound absorption sheet 303) disposed on at least one surface of the first structure or the second structure in the resonance space.

In an embodiment, the sound absorption sheet may include at least one of PORON, rubber, or silicone.

In an embodiment, the part of the first structure may include a "T"-shaped open loop.

In an embodiment, a part of the second structure may be disposed in an open portion of the open loop to form the opening.

In an embodiment, a space compensation material may be disposed in a remaining space which remains after the adsorption material is disposed, in the resonance space.

In an embodiment, the space compensation material may include at least one of zeolite, sponge, cotton, or foamed resin.

In an electronic device including a speaker assembly according to various embodiments, the speaker assembly may include a first carrier (e.g., the first structure 311), a second carrier (e.g., the second structure 312) configured to couple to the first carrier, and a speaker (e.g., the speaker unit 301) coupled to at least one of the first carrier and the second carrier, wherein the second carrier includes at least one groove configured to form a resonance space (e.g., the resonance space RS) by coupling between the first carrier and the second carrier, wherein the resonance space is connected to the speaker and has an adsorption material (e.g., the adsorption material 803) injected therein, and wherein while the first carrier and the second carrier are coupled, one end of the groove includes an opening (e.g., the opening 500) formed in a closed loop including a part of the first carrier and a part of the second carrier.

In an embodiment, in the electronic device, the speaker assembly may further include a first sealing member configured to close the opening.

In an embodiment, the electronic device may further include a second sealing member configured to close a recess formed by coupling between the first carrier and the second carrier.

In an embodiment, the second sealing member may include at least one of a eutectic bond or a polymer adhesive.

In an embodiment, the electronic device may further include a sound absorption sheet disposed on at least one surface of the first carrier or the second carrier in the resonance space.

In an embodiment, the sound absorption sheet may include at least one of PORON, rubber, or silicone.

In an embodiment, a part of the first carrier may include a "T"-shaped open loop.

In an embodiment, a part of the second carrier may be disposed in an open portion of the open loop to form the opening.

In an embodiment, a space compensation material may be disposed in a remaining space which remains after the adsorption material is disposed, in the resonance space.

In an embodiment, the space compensation material may include at least one of zeolite, sponge, cotton, or foamed resin.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A speaker module structure comprising:
 a first structure;
 a second structure configured to couple to the first structure to form a resonance space;
 a speaker connected to the resonance space and coupled to at least one of the first structure or the second structure; and
 an opening connected to the resonance space,
 wherein at least one of the first structure or the second structure comprises at least one groove configured to form the resonance space,
 wherein an adsorption material is disposed in the resonance space,
 wherein the opening is configured for injecting the adsorption material into the resonance space, and
 wherein the opening, configured for injecting the adsorption material into the resonance space, is formed by a coupling structure between the first structure and the second structure.

2. The speaker module structure of claim 1, further comprising:
 a first sealing member configured to close the opening.

3. The speaker module structure of claim 2, wherein the first sealing member is disposed along a peripheral portion of the opening.

4. The speaker module structure of claim 2, further comprising:
 a second sealing member configured to surround the first sealing member.

5. The speaker module structure of claim 4, wherein the second sealing member comprises at least one of a eutectic bond or a polymer adhesive.

6. The speaker module structure of claim 1, further comprising:
 a sound absorption sheet disposed on at least one surface of the first structure or the second structure in the resonance space.

7. The speaker module structure of claim 6, wherein the sound absorption sheet comprises at least one of polyurethane, rubber, or silicone.

8. The speaker module structure of claim 1, wherein the opening comprises a "T"-shape.

9. The speaker module structure of claim 8,
 wherein a first part of the opening formed by the first structure comprises a horizontal portion of the "T"-shape and a first part of a vertical portion of the "T"-shape that is connected to the horizontal portion, and
 wherein a second part of the opening formed by the second structure comprises a second part of the vertical portion that is connected to the first part of the vertical portion.

10. The speaker module structure of claim 1, wherein a space compensation material is disposed in a remaining space adjacent to the opening that remains after the adsorption material is injected into the resonance space.

11. The speaker module structure of claim 10, wherein the space compensation material comprises at least one of zeolite, sponge, cotton, or foamed resin.

12. An electronic device comprising:
 a speaker assembly including:
  a first carrier,
  a second carrier configured to couple to the first carrier to form a resonance space,
  a speaker connected to the resonance space and coupled to at least one of the first carrier or the second carrier, and
  an opening connected to the resonance space,
 wherein at least one of the first carrier or the second carrier comprises at least one groove configured to form the resonance space, wherein an adsorption material is disposed in the resonance space, wherein the opening is configured for injecting the adsorption material into the resonance space, and wherein the opening, configured for injecting the adsorption material into the resonance space, is formed by a coupling structure between the first carrier and the second carrier.

13. The electronic device of claim 12, wherein the speaker assembly further includes a first sealing member configured to close the opening.

14. The electronic device of claim 13, wherein the first sealing member is disposed along a peripheral portion of the opening.

15. The electronic device of claim 13, wherein the speaker assembly further includes a second sealing member configured to surround the first sealing member.

16. The electronic device of claim 15, wherein the second sealing member comprises at least one of a eutectic bond or a polymer adhesive.

17. The electronic device of claim 12, wherein the speaker assembly further includes a sound absorption sheet disposed on at least one surface of the first carrier or the second carrier in the resonance space.

18. The electronic device of claim 17, wherein the sound absorption sheet comprises at least one of polyurethane, rubber, or silicone.

19. The electronic device of claim 12, wherein the opening comprises a “T”-shape.

20. The electronic device of claim 19, wherein a first part of the opening formed by the first carrier comprises a horizontal portion of the “T”-shape and a first part of a vertical portion of the “T”-shape that is connected to the horizontal portion, and wherein a second part of the opening formed by the second carrier comprises a second part of the vertical portion that is connected to the first part of the vertical portion.

21. The electronic device of claim 12, wherein a space compensation material is disposed in a remaining space adjacent to the opening that remains after the adsorption material is injected into the resonance space.

22. The electronic device of claim 21, wherein the space compensation material comprises at least one of zeolite, sponge, cotton, or foamed resin.

* * * * *